United States Patent [19]
Cerrato

[11] 4,406,301
[45] * Sep. 27, 1983

[54] KEG-TAPPING STRUCTURE

[75] Inventor: Vincent J. Cerrato, Pomona, N.Y.

[73] Assignee: Vending Components, Inc., Hackensack, N.J.

[*] Notice: The portion of the term of this patent subsequent to Dec. 14, 1999 has been disclaimed.

[21] Appl. No.: 281,557

[22] Filed: Jul. 8, 1981

Related U.S. Application Data

[63] Continuation-in-part of Ser. No. 251,955, Apr. 7, 1981, Pat. No. 4,363,336.

[51] Int. Cl.³ .............................................. F16K 35/00
[52] U.S. Cl. .................................... 137/212; 137/322; 222/400.7; 285/18
[58] Field of Search .............................. 137/212, 322; 222/400.7, 153; 251/148, 150; 285/DIG. 5, 307, 18, 303, 376

[56] References Cited

U.S. PATENT DOCUMENTS 3,939,860  2/1976  Golding .......................... 137/212
4,351,456  9/1982  Nezworski ..................... 137/212 X
4,363,336  12/1982  Cerrato ........................... 137/212

Primary Examiner—Alan Cohan
Attorney, Agent, or Firm—Hopgood, Calimafde, Kalil, Blaustein & Judlowe

[57] ABSTRACT

The invention contemplates removable structure to facilitate keg-tapping, and pressurized dispensing of liquid contents of the keg. A so-called Barnes neck forms part of the keg and has a bore with an elastomeric ring seal and flange at its lower end, and a valve-and-tube subassembly is inserted through the neck, to the point of valve-body compression of the seal, when secured by a removable retaining ring. In the course of such insertion, one or more radially inward lugs on the neck flange track corresponding slot formations in the subassembly. Each such slot formation has a first upward longitudinal course, leading to an angular bayonet-like offset course, and then to a second upward longitudinal course. The location of the angular offset is such that the valve body cannot compressionally load the seal ring in the absence of the partial rotation needed to develop lug alignment with the second upward longitudinal course.

7 Claims, 7 Drawing Figures

FIG. 5.
FIG. 6.
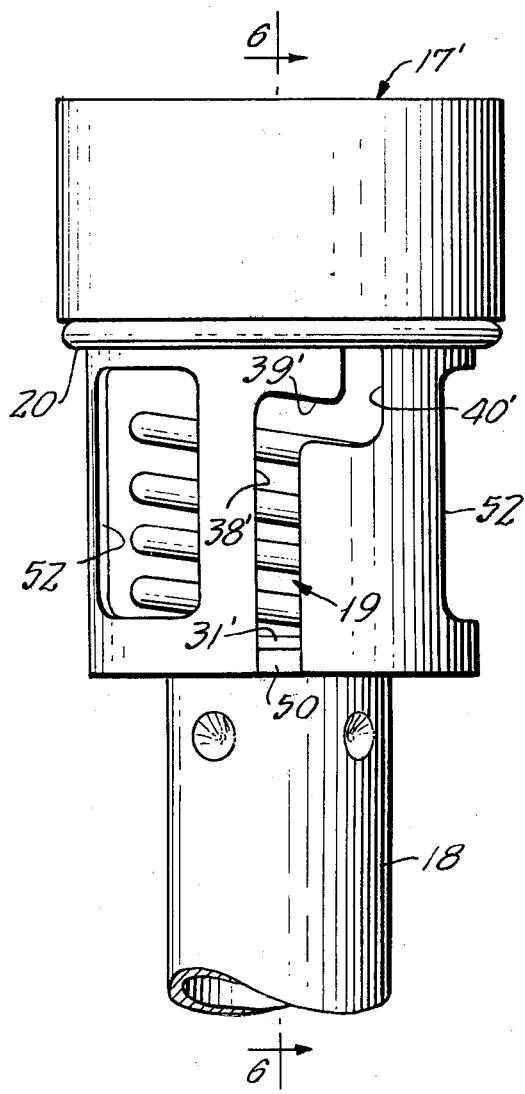
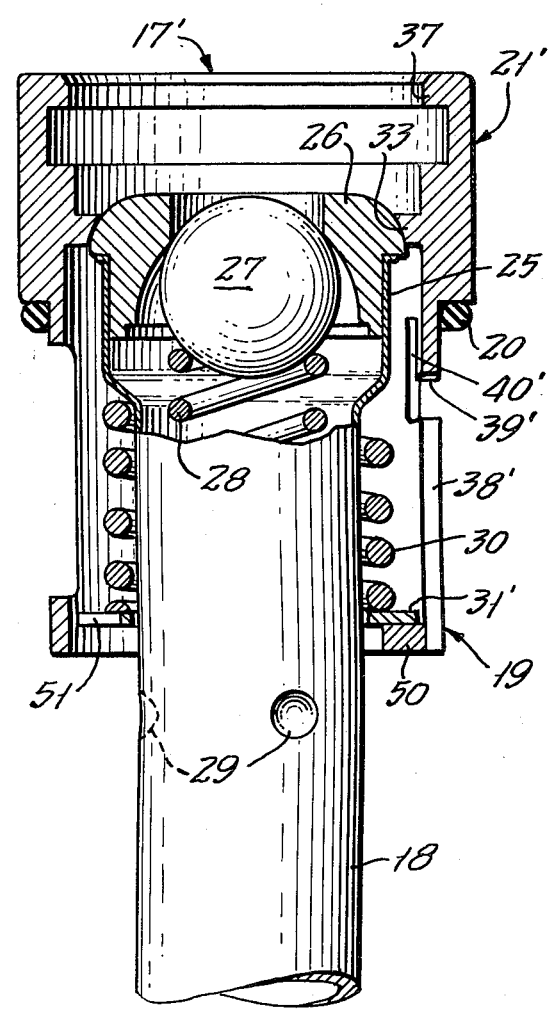

KEG-TAPPING STRUCTURE

RELATED CASE

This application is a continuation-in-part of my copending application Ser. No. 251,955, filed Apr. 7, 1981 now U.S. Pat. No. 4,363,336 issued Dec. 14, 1982.

BACKGROUND OF THE INVENTION

This invention relates to structure adapted for the selective tapping of a keg, particularly applicable to the pressurized dispensing of liquid contents such as beer. More particularly, the invention pertains to removable valve and tube coaction with a so-called Barnes neck, which is a permanent part of a keg.

Fallon U.S. Pat. No. 4,181,143 sets forth background and problems associated with structures of the character indicated, and therefore said patent and the many patents and other references of record in said patent provide a setting for description of the present invention. It suffices to note problems associated with devices as described in said patent; among these is the inherent asymmetry of a safety feature intended to prevent pressure within a keg from accidentally expelling valve structure from the keg, in the course of removing a tap fitting or other connection from the adapter structure. Also, the structure of said patent calls for unnecessarily complex fabrication, involving a weakening of the Barnes neck.

BRIEF STATEMENT OF THE INVENTION

It is an object of the invention to provide improved structure of the character indicated, avoiding disadvantages of prior devices.

A specific object is to provide a symmetrically operative safety feature in such structure, whereby axial alignment of cylindrical or rotatable parts is assured, even while retaining parts against expulsion, in the course of safety-venting a given keg.

Another specific object is to provide an improved Barnes neck with safety-venting accommodation, while enabling conventional engine-lathe operations to perform all machining.

It is a general object to achieve the foregoing objects with inherently reliable and safe structure, and at reduced cost of manufacture.

The invention achieves the above objects and other features by providing one or more safety-lock lugs at integral radially inward formations of the seat or shoulder within a Barnes neck, the valve and tube subassembly being insertable through the neck, with the lugs engaging slot configurations in the subassembly, requiring first longitudinal, then offsetting angular, and at least some second longitudinal displacement before the subassembly can develop its ultimately sealed seating with reference to the shoulder of the Barnes neck. A retaining ring in a bore groove of the neck can be made to sealingly retain the inserted subassembly only if the angularly offset second longitudinally displaceable alignment has been achieved.

DETAILED DESCRIPTION OF THE INVENTION

A preferred embodiment of the invention will be described in conjunction with the accompanying drawings, in which:

FIGS. 4A, 4B and 5 are fragmentary vertical sectional views to show each of two different parts relations, involved in use of the structure of FIG. 1; and FIGS. 5 and 6 illustrate a modification of the insert-subassembly part of FIG. 1, FIG. 5 being a view in side elevation, and FIG. 6 being a sectional view taken at 6—6 in FIG. 5.

Figure 1:
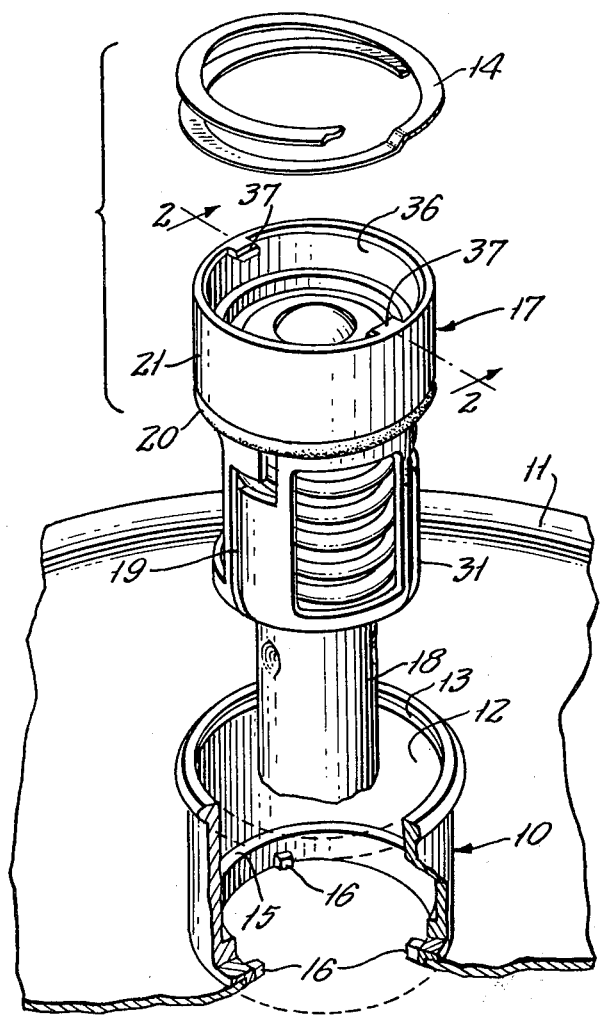
FIG. 1 is a partly broken-away and exploded perspective view of coacting neck, insert-subassembly and retainer parts of keg-tapping adapter structure.
Figure 2:
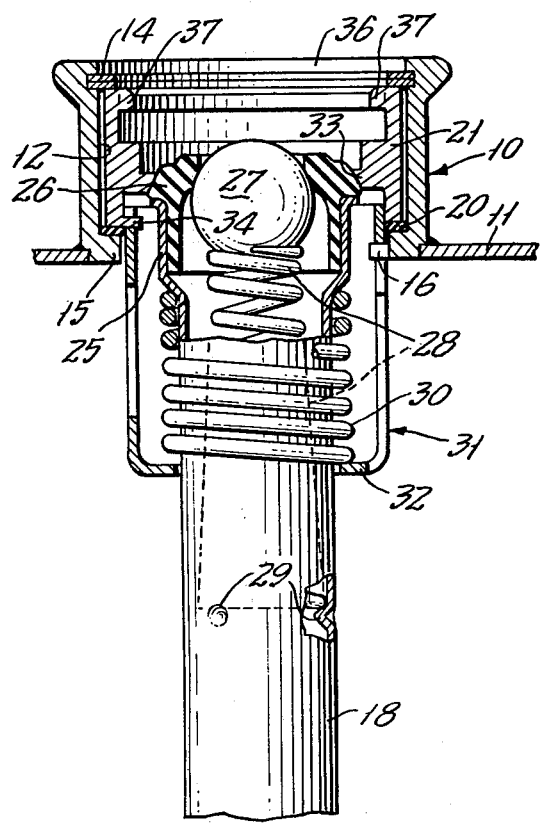
FIG. 2 is an enlarged vertical section, taken substantially at 2—2 in the insert subassembly of FIG. 1.

Referring initially to FIGS. 1 and 2, the invention is shown in the context of a Barnes neck 10 having circumferentially welded permanent assembly to one of the end panels of a keg 11, such as a beer keg. The neck 10 has a cylindrical bore 12, with a circumferential groove 13 for removable reception of a retaining ring 14 near its upper end. At its lower end, neck 10 has a radially inward flange 15 with plural equally spaced radially inward locking lugs 16, forming part of the invention. A subassembly 17 of valve components, including a syphon tube 18, features slot formations 19 of the invention, coacting with lugs 16 in the course of subassembly insertion in and removal from the neck 10. When fully inserted and assembled, an elastomeric seal ring 20 is compressionally loaded by an annular upper housing 21 against and in circumferentially continuous sealed relation with the flange 15; the retaining ring 14, when seated in groove 13, holds the sealed, compressionally loaded relation.

In FIG. 2, the tube 18 is seen to have an expanded upper end 25, into which the reduced lower end of an elastomerically clad annular valve seat 26 is fitted, to a shoulder-limited extent. A valve member or ball 27 has normally closed engagement with seat 26, being resiliently urged upwardly into such engagement, by reason of a compressionally loaded conical spring 28 which is retained within tube 18 at inward detents 29 thereof.

The rim or shoulder region of valve seat 26 is held in circumferentially sealed relation to a flange at the upper end of tube 18 by compressional loading action which derives from upper housing 21, a compression spring 30, and a pierced cup 31; spring 30 is compressed between a lower flange 32 of cup 31 and the flare at which tube 18 enlarges to its mouth, at 25. Upper housing 21 is formed with a beveled internal flange 33, by which it engages seat 26, and plural integrally formed radially inward lugs 34 in the lower skirt portion of housing 21 have bayonet-locking engagement with slot formations 35 in cap 31, to retain the compression-loading of seat 26. It will be understood that the preloaded closure of valve member 27 against seat 26, and the preloaded seal of seat 26 to the mouth 25 of tube 18, are features of the subassembly 17, so that when inserted in neck 10, involving running clearance between bore 12 and the cylindrical exterior of housing 21, and when sealed at 20 by the retaining action of ring 14, the valve member 27 is ready for actuation by the tail end of a tap or the like fitted to the exposed bore 36 of housing 21; diametrically opposed integral cam lugs 37 in bore 36 enable a conventional tap connection.

Figure 3:
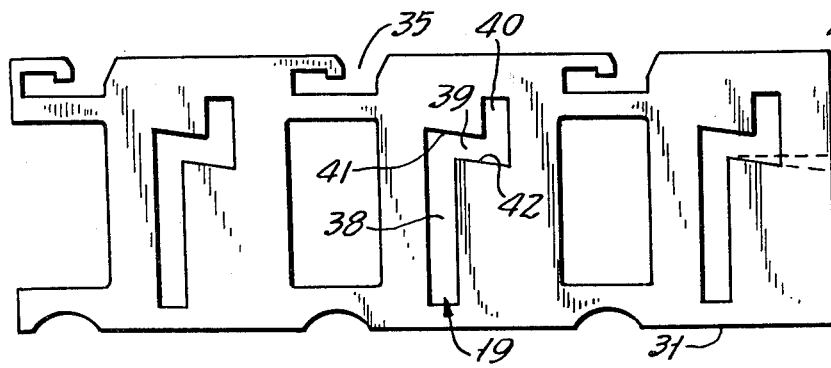
FIG. 3 is a flattened development of circumferential piercings in a part of FIGS. 1 and 2.
Figures 4A, 4B:
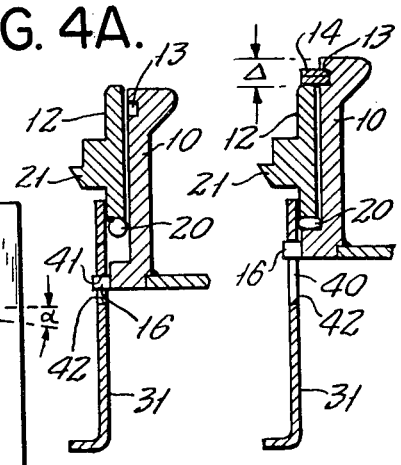

More specifically, and in particular reference to FIG. 3, the slot development 19 in cup 31 is seen to be preferably in triplicate, at equal angular spacing and in angular-interlace relation with the bayonet slots 35, by which parts 21-31 are engaged to hold spring 30 in compression. Each slot formation 19 comprises a first longitudinal course 38 leading to an angularly offsetting bayonet course 39, and thence to a second longitudinal course or offset 40. Upon insertion of subassembly 17 in neck 10, each lug 16 enters a different one of the first longitudinal courses 38, encountering interference with the step or notch edge 41 prior to any appreciable compression of seal ring 20. Partial clockwise rotation of subassembly 17 (via grasp of housing 21) then brings all lugs 16 into alignment with the second longitudinal courses 40; at this point, the upper edge of housing 21 axially overlaps or at least partially overlaps groove 13, as in the relation shown in FIG. 4A. Thereafter, and upon sufficient downward displacement of subassembly 17 (to the extent Δ, while elastically compressing ring 20), the upper edge of housing 21 sufficiently clears or exposes groove 13 to permit assembly of retaining ring 14 therein, as shown in FIG. 4B. It will be noted that in the thus-secured relation (FIG. 4B), all lugs 16 clear (or at least do not develop interference with) the upper end of their associated second longitudinal slot courses 40 and that they are not so far displaced down courses 40 as to invite angular displacement out of alignments 40.

The described structure of FIGS. 1 to 4 will be seen to meet all stated objectives. A stainless-steel casting of the Barnes neck 10 requires only conventional lathe operations to produce the completed part; no piercing of the neck is needed. And the described 3-lug (16) and 3-slot (19) arrangement not only prevents ring (14) assembly until the requisite partial rotation has occurred via offset 39, but also assures that when ring 14 is removed, pressure within keg 11 can only incrementally expel subassembly 17 to the point of symmetrically arrested, pressure-venting support, when each lug 16 abuts the step or notch edge 42, marking the lower end of each course 40. As shown in the drawing, the angular offset 39 is preferably downward sloping (at the angle α) from course 38 to course 39, to provide even greater assurance against loss of the course-40 alignment of each lug 16, as while manipulating or attempting to manipulate retaining ring 14 into its groove-seated position.

In the modification of FIGS. 5 and 6, the insert subassembly 17' has several of the same parts and features described in connection with FIGS. 1 to 4 and therefore many of the same reference-number identifications are used. The principal difference in FIGS. 5 and 6 is that what involved bayonet-engageable separable housing (21) and cup (31) parts in FIGS. 1 to 4 is now replaced by a single elongate housing member 21', which fully contains the compression spring 30, the latter being removably held in place by a retaining ring 31' seated against plural inward lugs 50 at the lower end of housing member 31'. More specifically, the housing member 21' is a machined tubular casting having in its larger upper end the same lug formations 37 and seat flange 33 as have already been described. The lower end of member 21' is reduced to define a shoulder for compressional seating against seal ring 20. Below this shoulder, member 21' continues tubular to its lower end, where it may have three equally spaced retaining lugs 50, it being understood that retaining ring 31' has an equal number of equally spaced cut-outs 51, whereby ring 50 becomes removably insertable when formations 50-51 are in angular register, and whereby the retained position shown is reached upon angular displacement from the relation of angular register. Finally, the reduced end of housing member 21' is characterized by slot and aperture formations similar to those described in connection with FIG. 3; specifically, each of plural slots 19 has a first longitudinal course 38', leading to an angularly offsetting bayonet course 39', and thence to a second longitudinal course or offset 40'. As previously, all slots 19' coact with individual spaced lug formations 16 in neck 10 (FIG. 2), and openings 52 between slots 19' enable maximum access for cleaning purposes. Preferably, and as shown in FIGS. 5 and 6, each of the retaining lugs 50 connects adjacent regions of the inner wall of the reduced end of member 21' and spans the otherwise open end of the associated slot course 38', thereby preserving circumferential integrity for the lower end of housing member 21'.

Features summarized above for the embodiment of FIGS. 1 to 4 will be seen also to apply to the embodiment of FIGS. 5 and 6. And it can be additionally observed that the embodiment of FIGS. 5 and 6 offers the further advantage of more simple and economic construction, which is more readily serviced.

While the invention has been described for a preferred embodiment, it will be understood that modification may be made within the scope of the invention, as for example by providing slot 19 in a number other than the preferred number of three.

What is claimed is:

1. As an article of manufacture, a valve and downtube subassembly adapted for removable connection of a tapping unit to a keg, wherein the keg has a cylindrical annular neck with a bore having near its upper end a circumferential groove adapted to removably receive a retaining ring and with a seal-seating radially inward neck flange near the lower end of the bore, the valve and downtube subassembly being removably receivable in said neck with the downtube projecting through and downwardly of said flange;

said valve and downtube subassembly comprising an annular housing having a radially inward valve-seat flange, said housing including an upper annular portion insertably receivable in said bore and adapted for seal-seated support by said neck flange when retained at its upper end by a retaining ring seated in said groove, said housing further integrally including a lower annular portion extending below said neck flange, the valve of said subassembly comprising an annular seat in lower abutment with the upper end of said tube and in upper abutment with said valve-seat flange, a compression spring within said annular housing and reacting between the lower end of said housing and the upper end of said tube to compressionally load said annular seat between said upper and lower abutments; and one or more integral radially inward lugs on said neck flange, said lower annular portion having one or more longitudinal slots engageable with said lugs on tube insertion through said neck, each slot terminating in an angular bayonet offset and in a further longitudinally upward offset, whereby subassembly insertion involves a first lug-keyed longitudinally downward displacement followed by angular rotation through the bayonet offset and ending with a second lug-keyed longitudinally downward displacement, so that independent of any retention of said subassembly via a retaining ring in said groove, the longitudinally limited extent of lug engagement in the further slotted-offset relation will assure against removal or expulsion of said subassembly, in the absence of a deliberate bayonet-dislocating angular displacement.

2. The article of claim 1, in which a retaining ring and coacting lug formations at the lower end of said lower annular portion provide the means of seating said compression spring for reaction at the lower end of said housing.

3. The article of claim 2, in which each lug formation at the lower end of said lower annular portion integrally spans one of said longitudinal slots.

4. The article of claim 1, in which the number of longitudinal slots and of said neck lugs is three, at equal angular spacing.

5. The article of claim 1, in which said upper annular housing portion integrally includes radially inward lug formations adapted for removable engagement with a tapping subassembly.

6. The article of claim 1, in which said upper annular housing portion has a cylindrical exterior having running clearance with the neck bore and in radial overlap with said flange, and an elastomeric seal ring around said lower annular portion and adapted to be interposed between said upper housing portion and said flange, the upper end of said upper housing portion being in at least partial axial overlap with the neck groove in the absence of a retaining ring in the groove, whereby said subassembly must be depressed to compressionally load said elastomeric seal ring when a retaining ring in the groove has retaining engagement with the upper end of said upper housing portion, the effective length of said further longitudinally upward offset being sufficient to avoid interference with the seal-ring compressing displacement which accommodates and is retained by retaining-ring assembly to the groove.

7. The article of claim 6, in which the longitudinal location of angular-slotted offset is such that said seal ring will not be compressed in the absence of lug alignment with the associated further upward offset.

* * * * *